US011047205B2

(12) United States Patent
Atencio

(10) Patent No.: US 11,047,205 B2
(45) Date of Patent: *Jun. 29, 2021

(54) ENERGIZED GATE VALVE SEAL ASSEMBLY

(71) Applicant: Fracmaster, LLC, Houston, TX (US)

(72) Inventor: Don Atencio, Farmington, NM (US)

(73) Assignee: Fracmaster, LLC, Houston, TX (US)

(*) Notice: Subject to any disclaimer, the term of this patent is extended or adjusted under 35 U.S.C. 154(b) by 408 days.

This patent is subject to a terminal disclaimer.

(21) Appl. No.: 15/848,400

(22) Filed: Dec. 20, 2017

(65) Prior Publication Data
US 2018/0112492 A1 Apr. 26, 2018

Related U.S. Application Data

(63) Continuation of application No. 13/869,744, filed on Apr. 24, 2013, now Pat. No. 9,850,740.

(60) Provisional application No. 61/638,623, filed on Apr. 26, 2012.

(51) Int. Cl.
*E21B 34/02* (2006.01)
*F16K 3/20* (2006.01)

(52) U.S. Cl.
CPC .............. *E21B 34/02* (2013.01); *F16K 3/207* (2013.01)

(58) Field of Classification Search
CPC .......... E21B 34/00; E21B 34/02; E21B 3/207; F16K 3/207
See application file for complete search history.

(56) References Cited

U.S. PATENT DOCUMENTS

| 1,476,344 A | 12/1923 | McGee et al. |
| 3,044,741 A | 7/1962 | Grove |
| 3,095,004 A | 6/1963 | Jackson, Jr. et al. |
| 3,181,552 A | 5/1965 | Jackson |
| 3,367,625 A | 2/1968 | Fortune |
| 3,504,885 A * | 4/1970 | Hulsey ................. F16K 5/0673 251/172 |
| 4,136,710 A * | 1/1979 | Bond ....................... F16J 15/46 137/246.22 |

(Continued)

OTHER PUBLICATIONS

Gate. (2020). In Merriam-Webster (Online Edition). Retrieved from www.merriam-webster.com/dictionary/gate (Year: 2020).*

(Continued)

*Primary Examiner* — Robert E Fuller
(74) *Attorney, Agent, or Firm* — Ramey & Schwaller LLP; Daniel J. Krueger

(57) ABSTRACT

A valve seal assembly that provides for external pressure to be introduced to an energized seal of a valve, and compress the seal against a gate with enough force to block any paths where sand and chemicals would otherwise travel into valve body cavity or void. The external pressure introduced through pressure fitting makes the parts move like piston forcing the parts to compress together eliminating the machined tolerances or gaps required for the gate to be opened or closed. The compression can be provided by hydraulic pressure devices through injection ports. A separate valve seal assembly can be provided for each face of the gate and both assemblies can be activated when the fluids are flowing (open position) and an upstream valve seal assembly activated when the gate is in a closed position.

16 Claims, 6 Drawing Sheets

(56) References Cited

U.S. PATENT DOCUMENTS

| | | | | |
|---|---|---|---|---|
| 5,322,261 A | * | 6/1994 | Aarnes | F16K 5/205 251/159 |
| 5,624,101 A | * | 4/1997 | Beson | F16K 3/20 251/172 |
| 9,850,740 B2 | | 12/2017 | Atencio | |

OTHER PUBLICATIONS

Non-Final Office Action dated Sep. 28, 2015, in U.S. Appl. No. 13/869,744.
Final Office Action dated Jul. 11, 2016, in U.S. Appl. No. 13/869,744.
Non-Final Office Action dated Nov. 14, 2016, in U.S. Appl. No. 13/869,744.
Final Office Action dated Mar. 28, 2017, in U.S. Appl. No. 13/869,744.

* cited by examiner

ENERGIZED GATE VALVE SEAL ASSEMBLY

RELATED APPLICATIONS

This application is a continuation of U.S. patent application Ser. No. 13/869,744, filed Apr. 24, 2013, titled HYDRASEAL FRAC VALVE, which in turn claims priority to U.S. Provisional Application No. 61/638,623, filed Apr. 26, 2012, entitled HYDRASEAL SANDLOCK VALVE. The disclosures in each of the foregoing applications are hereby incorporated herein by reference.

BACKGROUND OF THE INVENTION

Field of the Invention (Technical Field)

The presently claimed invention relates to oil and gas equipment, and more particularly to an apparatus and method to block or prevent debris, chemicals, and sand from entering the internal body cavity of hydraulic fracturing (fracking or frac) equipment and valves.

Background Art

In the oil and gas industry there is a practice called fracking, to speed up the migration of gas and petroleum fluid from source rocks or reservoir rocks. This is a process where high pressure pumps and powerful engines pump sand, water and/or chemicals through high pressure flow lines, valves, and equipment that are attached to fracking devices known in the industry as a frac valve, frac stack or frac equipment, hereinafter referred to collectively as a frac valve. A frac valve can be configured in many different sizes and pressure ratings. Each design is usually specific to the user's application and requirements. Frac valves are attached to a wellhead that is attached to a high-pressure pipe that can extend thousands of feet into the ground and cemented into gas or oil formations. These devices are attached to the wellhead by bolting or other well-known means of fastening and are tightened to a predetermined torque by hydraulics or hammer tools.

The fracking process requires high pressure pumps to push the fracturing fluids, including proppants, a material such as grains of sand, ceramic, or other particulates, that prevent the fractures from closing when the injection is stopped, into the injected fluid and chemicals through the frac valves for several hours or days; depending on the amount of proppants and fluids required to be injected into the ground at high pressures, and velocity to break up and create cracks in the formation.

A typical frac valve 10 is shown in FIG. 1. During the fracking process, abrasive proppants, fluids, and chemicals 12 are able to flow 14 through the bores of frac valve 10 at high pressures and high velocities and into the casing wellbore and finally into the formation. During this process, cavities 16 of frac valve 10 also allows proppants 12 to pass into the valve body cavity 16, an area or void behind the mechanical moving parts. This allows the injection fluid to travel into the valve bore cavity and fill with debris 18, such as the frac sands and chemicals. Once the chemicals and sand work their way into the cavities and bores, or spaces between parts, which are required for any moving part to function properly, many problems occur that cause the equipment to wear, malfunction, fail or become inoperable. This can cause a dangerous situation to life and/or the environment.

A typical frac valve 10 as shown in FIG. 1, is used to contain and shut off pressure to perform special or specific functions during a frac operation by opening and closing gate 20, by lowering to allow the flow or raising to stop the flow, by means of a hand operated wheel or by means of air or hydraulic actuators. The high pressure is sealed off by closing the gate during or after the fracturing operation. There are many points in the current design of frac valves 10, which still require improvements despite the fact that the known frac valves have been commercially successful and have lessened dangers in operation.

First, frac valves 10 and other associated high-pressure valves must be operated under or with high pressure. Additionally, sometimes frac valves 10 require high torque to force the gate opened and closed at high pressures that are pressing against the open or closed gate 20 of the frac valve 10. Typical prior art frac stack valves 10 fill with debris 18 during the fracturing process by debris leaking through the connection between the gate and the valve aperture, and may not allow valve gate 20 to fully open or close, creating a dangerous or unsafe environment.

While frac stack valves 10 and fittings have tightly controlled inside and outside parameters, there must be looser tolerances in order for a frac valve gate 20 to travel in and out of the valve body cavity 16. Accordingly, due to these loose tolerances, gate 20 cannot properly seal against or seat on one or both sides of gate 20 during the open position and one side during the closed position. Conversely, the tolerances and packing or seal may fit loosely against the gate face but may be too loose and thus, susceptible to permitting proppant chemical or debris to enter valve body cavity 16 during the fracturing process. This causes operational problems, which include the inability to fully close gate 10, to fully open gate 10, or to damage the seal surface of gate 10, by corrosion, washed seats or the like.

Presently, attempts to solve this problem include pumping heavy and expensive greases or sealants in the bore or cavities in order to prevent or block pathways by installation of devices or springs that apply force against the parts to limit the tolerances. The shortcomings of injecting special greases or sealants fails to prevent the problems of debris collection, corrosion, and the injection must be repeated each time a valve is cycled. Therefore, there is a need for an apparatus and method for effectively blocking the pathways for debris entering a valve body cavity during a fracking operation without jeopardizing the normal operation of the valve.

SUMMARY OF THE INVENTION
(DISCLOSURE OF THE INVENTION)

The presently claimed invention solves the aforementioned problems by providing an apparatus and method to mechanically energize at least one seat to move and press against the gate with enough force and pressure to prevent and block the passage of fluids and debris from entering into the body of the valve cavity.

The presently claimed invention provides a seat seal piston apparatus, to facilitate the insertion of pressure into an energizer ring, which engages and forces the seat to seal against the gate with enough force to block and lock debris and fluids in the bore of the valve and prevent the debris and fluids from entering the body cavity in an open or closed gate configuration. When the energizer ring is deactivated, the gate can be reset to a new position.

An object of the presently claimed invention is to mechanically compress or energize valve seats, to achieve a mechanical seal independent of well bore pressure, generally needed to affect seal and block debris from entering cavity or internal parts of valves that could cause the valve to malfunction.

Advantages of the presently claimed invention are increased safety and environmental protection, decreased repair or maintenance costs, and increased life of the equipment.

Other objects, advantages, and novel features, and further scope of applicability of the presently claimed invention will be set forth in part in the detailed description to follow, taken in conjunction with the accompanying drawings, and in part will become apparent to those skilled in the art upon examination of the following, or may be learned by practice of the claimed invention. The objects and advantages of the claimed invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Best Modes for Carrying Out the Invention

The term "HydraSeal Frac Valve" is defined as an apparatus or system to block proppants, debris, and chemicals from entering into the valve body cavity by using a seat engagement or energizer ring. The energizer ring is installed in the bottom end of the seat assembly with a series of seals. The energizer ring provides a method for the seat seal assembly to provide a piston effect, whereby, pressure is introduced between the energizer ring and the seat causing the seals to press against the gate. It is important that the seals be capable of withstanding the high pressures prevailing at the wellhead and often generated by hydraulic fracking The preferred embodiment is shown in FIGS. 2-6. This embodiment allows external pressure to be introduced, and compresses the internal parts with enough force to block any paths where sand and chemical debris travel into the cavities of fracking equipment. The pressure is introduced by hydraulic forces into the body bushing, causing it to move like a piston forcing all the parts to compress together, thus, eliminating the mechanical tolerances required for the gate to move for opening and closing. The compression caused by introducing external hydraulic pressures blocks any and all pathways for the flow of the fluids other than through the valve.

Figure 1:
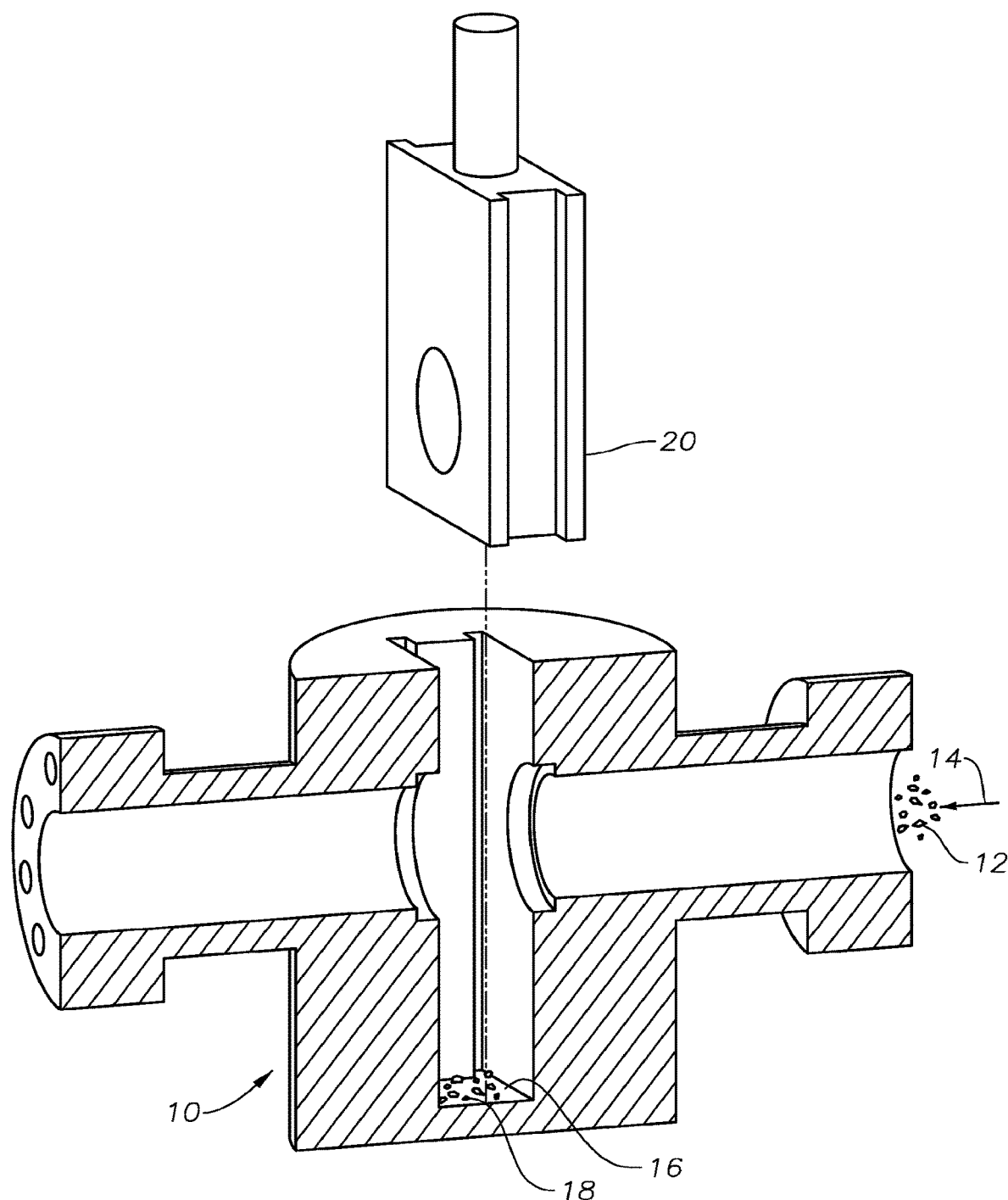
FIG. 1 shows a prior art valve configuration.
Figure 2:
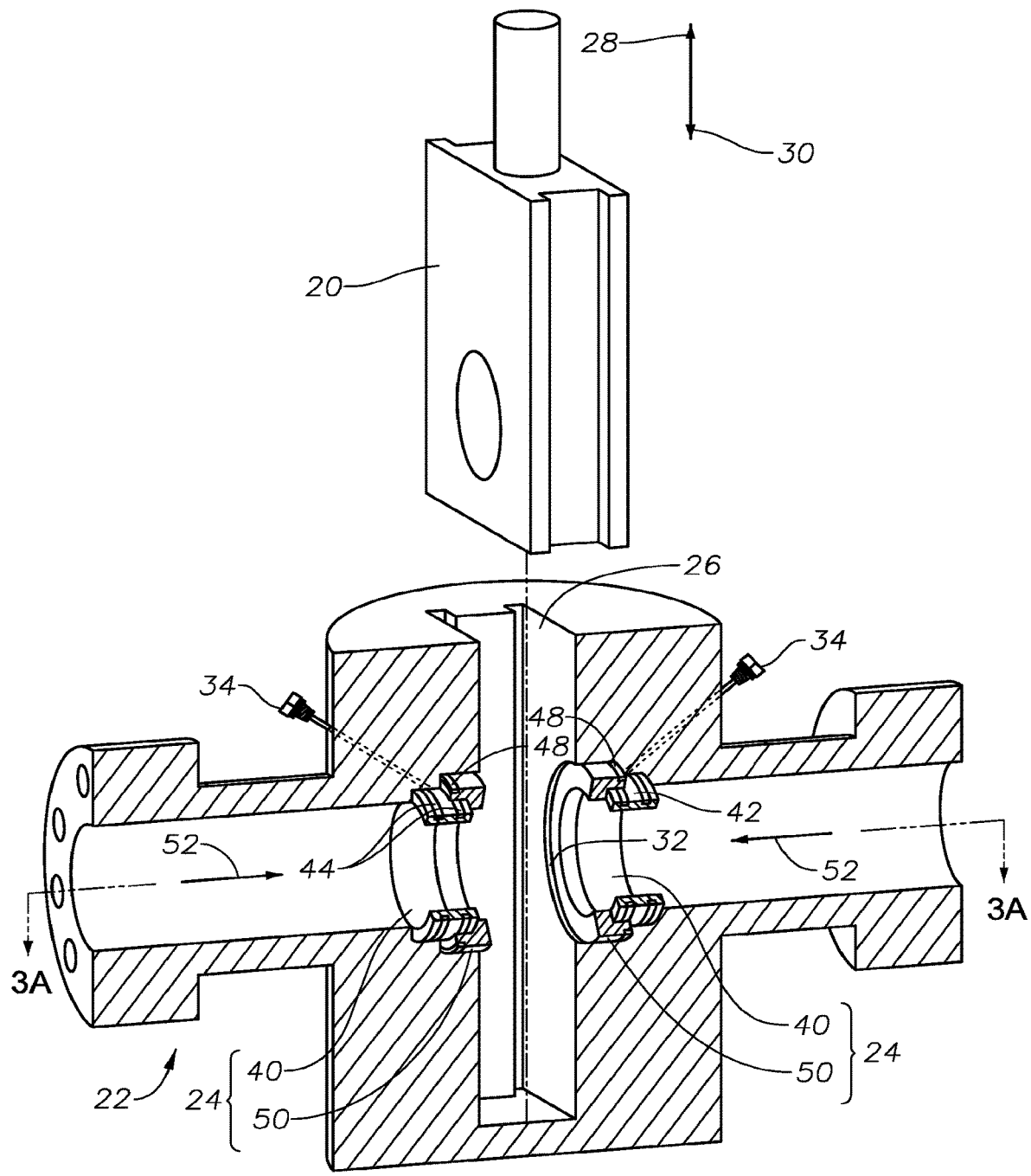
FIG. 2 is depicts a modified frac valve with the energized seal assemblies installed.

An off the shelf frac valve, as shown in FIG. 1, is modified as shown in FIG. 2. In this embodiment, gate 20 is provided to open and close as indicated in the background art section of this disclosure. Modified valve 22 has a vertical machined bore 26 for operation of valve gate 20. Gate 20 typically moves upwards 28 to close (prevent the fluid flow) and downwards 30 to open (initiate fluid flow). The modifications to the prior art valve are shown in FIG. 2. Modified valve 22 is machined to insert two substantially identical energized seal assemblies 24 into modified valve 22, as shown. Modified valve 22 has horizontally machined bores 32, or pockets, for installation of energized seal assemblies 24. Injection ports 34 are machined in modified valve 22 to inject pressure from an outside source to pass into energized seal assembly 24 for activation. Although two injection ports 34 are show for simplicity, any number of injection ports 34 can be used.

Figures 3A, 3B:
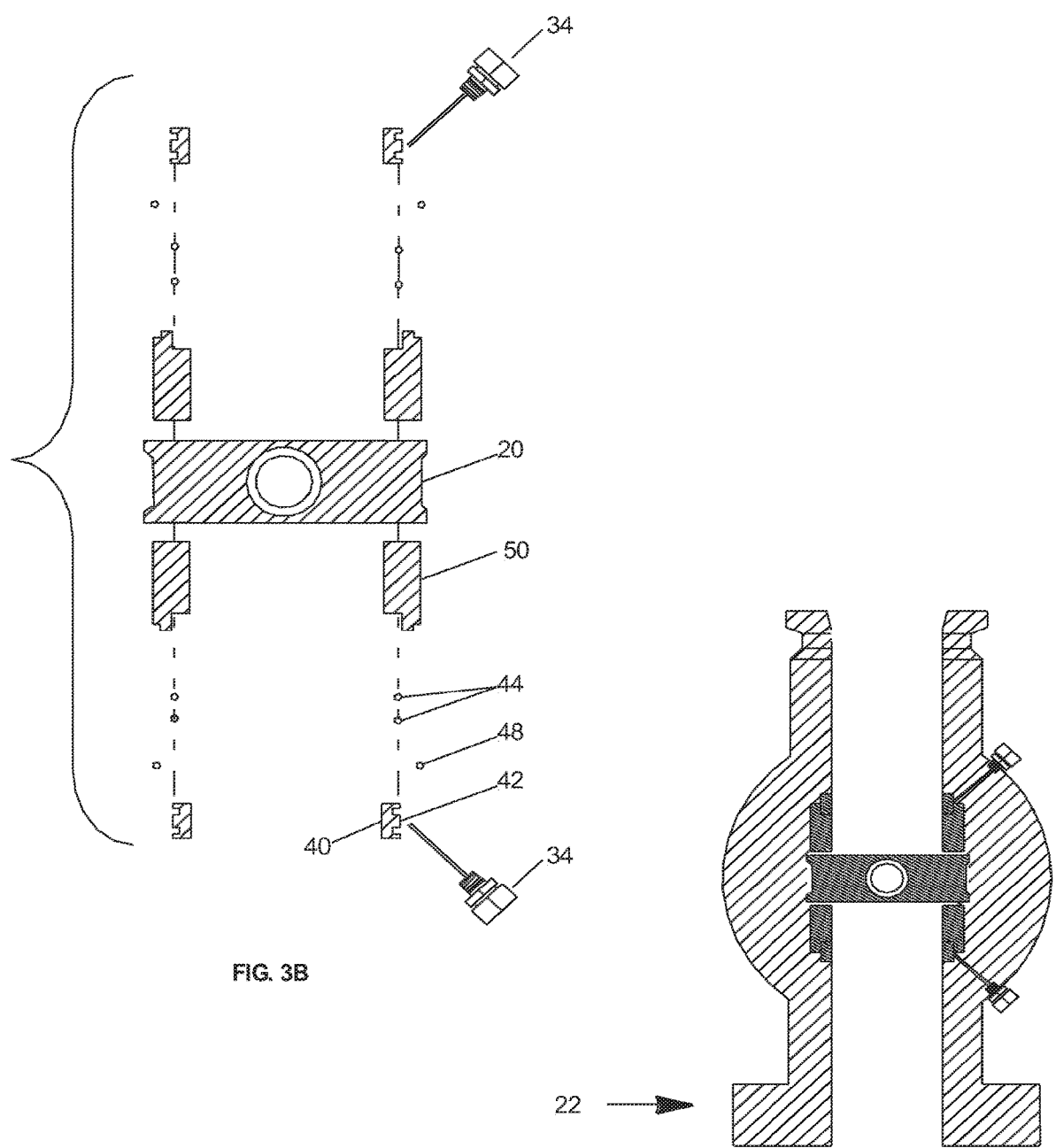
FIG. 3 shows a side view of modified valve and an exploded side view of two energized seal assemblies.
Figures 4A, 4B:
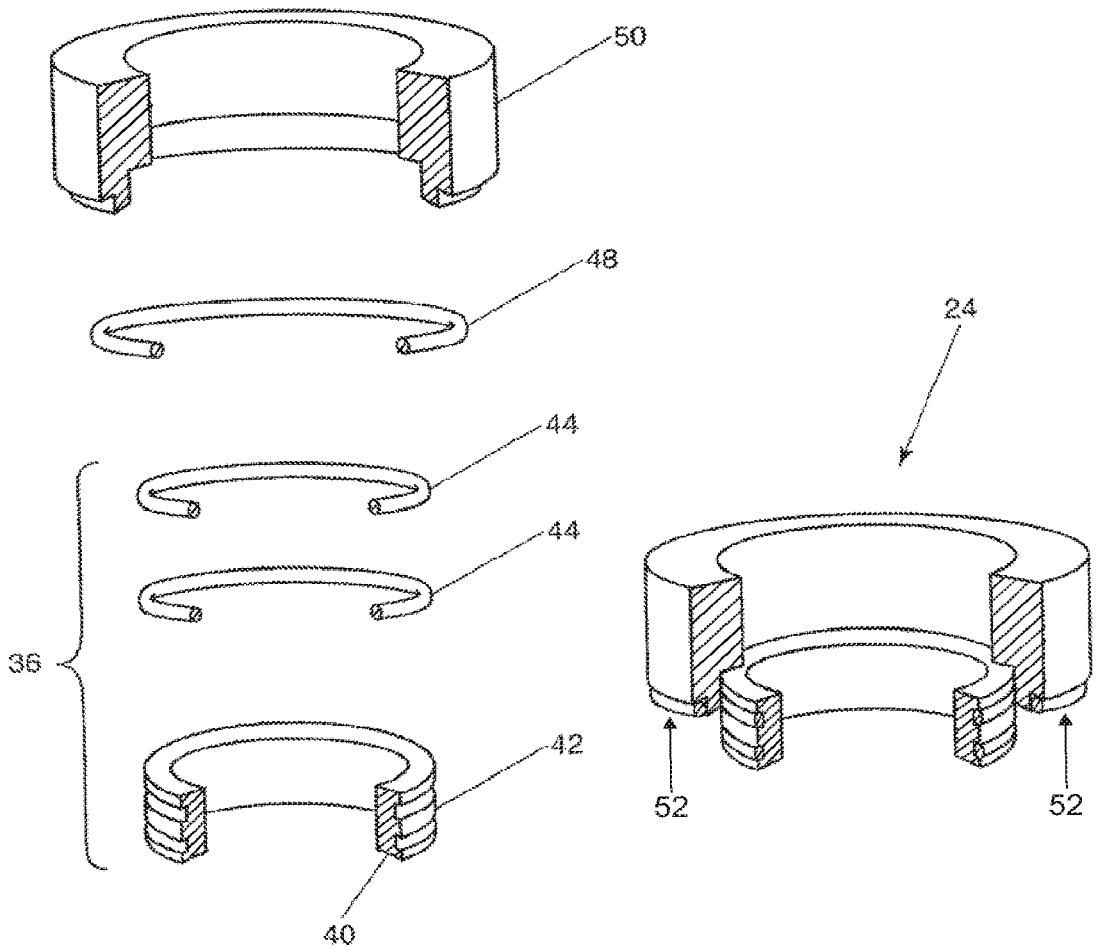
FIG. 4A shows an exploded perspective view of energized seal assembly.
FIG. 4B shows the energized seal assembly of FIG. 4A in a completed state.

An energized seal assembly 24 is shown in FIGS. 3, 4A, and 4B. FIG. 3 shows a side view of modified valve 22 and an exploded side view of two energized seal assemblies 24. FIG. 4A shows an exploded perspective view of energized seal assembly 24 and FIG. 4B shows the energized seal assembly of FIG. 4A in a completed state. As best shown in FIG. 4A, energizer ring assembly 36 comprises an energizer ring bushing 40, an energizer ring bushing cap, an energizer ring spacer 42, and two energizer assembly seals 44. Two energizer ring assemblies 24 are installed into the two outward horizontal pockets located in modified valve 22.

Valve seat seal 48 are installed onto the back of the valve seat 50. Two valve seats 50 are installed into the two inward pocket bores and over the two installed energizer ring assemblies 24. Two valve seats 50 and two energizer ring assemblies 24 form a piston effect moving inward towards the center of modified valve body 22 and against valve gate 20.

Figure 5:
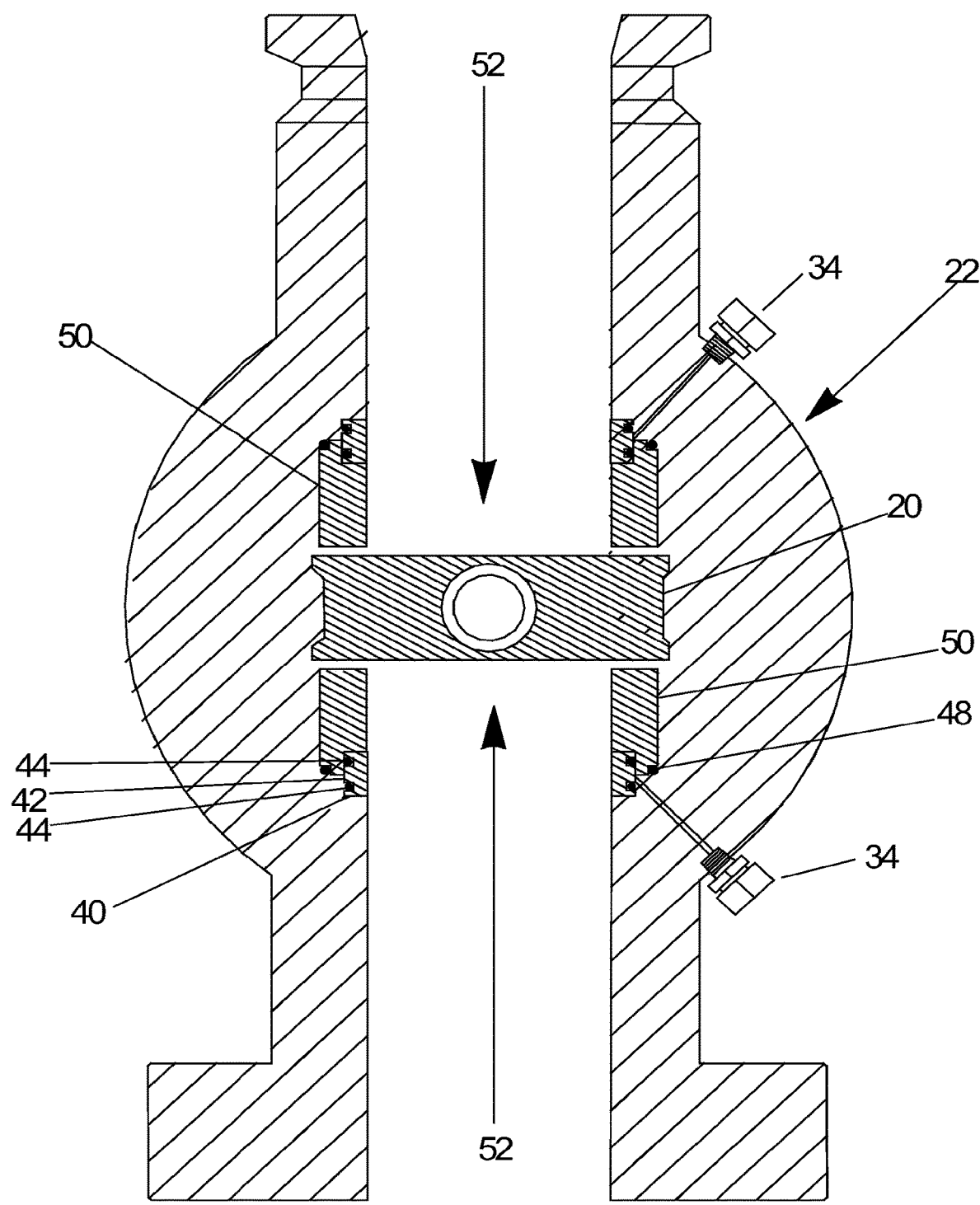
FIG. 5 is a side view of the configuration of FIG. 2.

Outside pressure is injected through the injection ports 34 located in modified valve body 22, and into energizer seal assemblies 24 pocket area, as shown in FIG. 5. The pressure is held by seals 44 and is transferred to the back of valve seat seals 46 and 48 located on the back of the valve seats 50. The applied pressure on back seals 46 and 48 on valve seats 50 forces 52 valve seats 50 against valve gate 20 creating a pressure seal area. While injection pressure is applied through the injection ports 34 on modified valve body 22, no pressure can enter into the body cavity area 16 and valve gate 20 cannot be operated.

Figure 6:
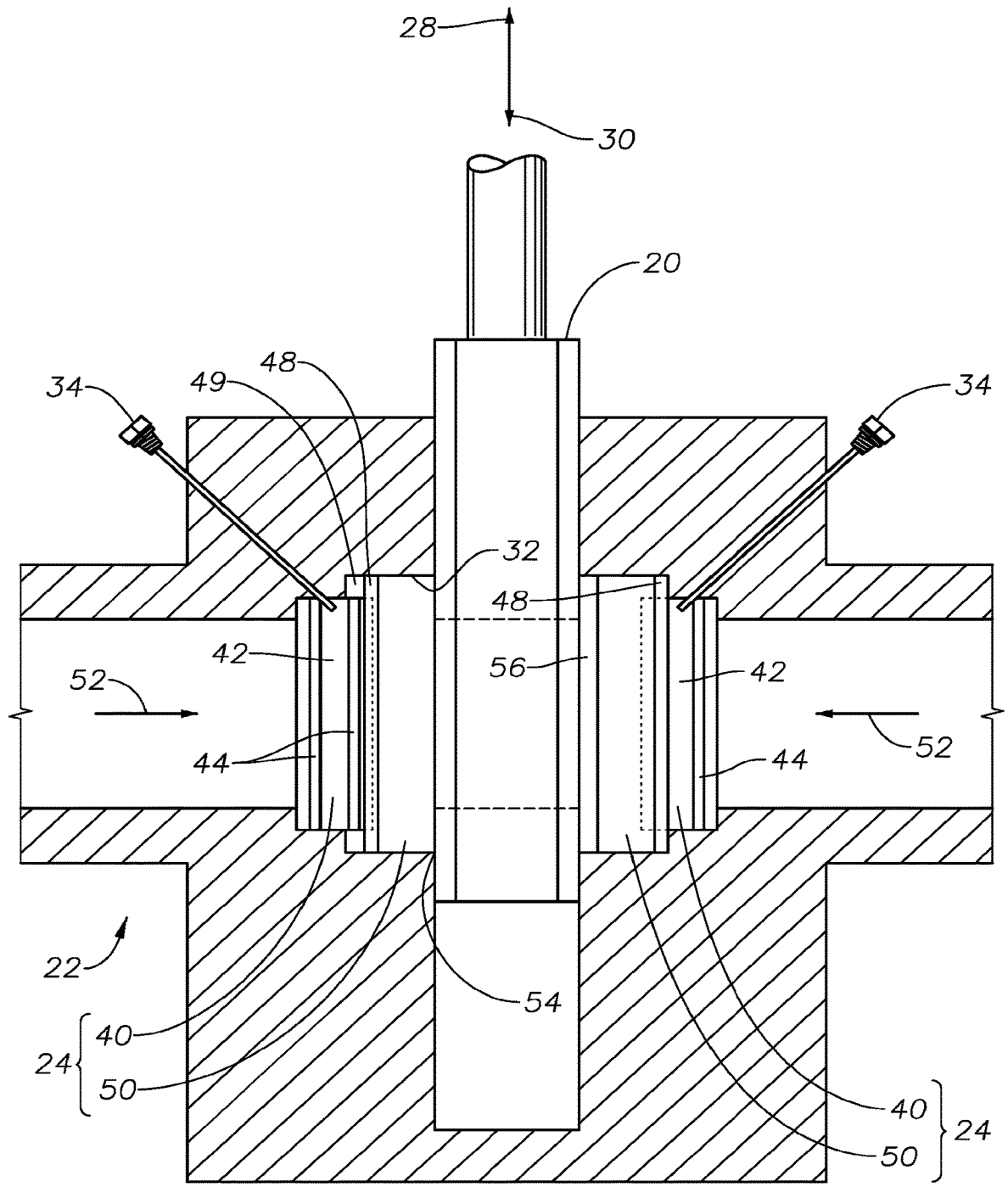
FIG. 6 shows the preferred embodiment in operation.

FIG. 6 shows the preferred embodiment in operation. Referring to FIGS. 2 through 6, when outside pressure in induces, energizer seal assembly is forced against gate 20 closing or sealing 54 the area between the gate face and energizer seal assembly 24, as shown in the left side of FIG. 6. The right side of the figure shows the energizer seal assembly in the dormant or not energized state, when no outside pressure is injected, thus, not sealing 56 the area between the gate face and energizer seal assembly 24. This embodiment of the not energized state in FIG. 6 is exaggerated to clearly show the operation of the embodiment. The energizer seal assemblies 24 are preferably independently operated. For example, when gate 20 is in a closed state (prevent fluids from flowing), energizer seal assembly 24 on the upstream side can be activated and the energizer seal assembly 24 on the downstream side need not be activated because there is no fluid flow in that area.

The claimed invention solves many mechanical and safety issues and it greatly reduces the cost of repairs and potential for equipment failure.

When the fracturing and/or the flow back processes are complete, or the position of the gate needs to be changed, you simply release the pressure from the injection ports and all parts go back to their original positions.

Although the claimed invention has been described in detail with particular reference to these preferred embodiments, other embodiments can achieve the same results. Variations and modifications of the presently claimed invention will be obvious to those skilled in the art and it is intended to cover all such modifications and equivalents. The entire disclosures of all references, applications, patents, and publications cited above, are hereby incorporated by reference.

What is claimed is:

1. A valve comprising:
    a valve body having a bore, and further having a cavity that accepts a gate movable between an open and closed position to control fluid flow through the bore;
    a seal assembly in a pocket of the valve body, the seal assembly including:
        a substantially cylindrical valve seat having a first seal on an outer circumferential surface of the valve seat to seal against an inner surface of the pocket; and
        an energizer ring bushing having a second seal on an outer circumferential surface of the bushing to seal against an inner surface of the pocket and a third seal on the outer circumferential surface of the bushing to seal against an inner surface of the valve seat, the first, second, and third seals defining a sealed area,
        the energizer ring bushing having surface areas of equal cross-section at both axial ends acted on by fluid pressure from the bore so as to experience no net force from the fluid pressure in the bore; and
    a pressure injection port configured to inject a fluid into the sealed area to press the valve seat against a face of the gate.

2. The valve of claim 1, wherein the fluid in the sealed area transfers pressure to a back surface of the valve seat.

3. The valve of claim 1, wherein the energizer ring bushing has an inner surface flush with a wall of the valve bore.

4. The valve of claim 3, wherein the valve seat is operable to isolate the cavity from the bore when the gate is in the open position.

5. The valve of claim 4, wherein the valve seat is operable to isolate the cavity from the bore when the gate is in the closed position.

6. The valve of claim 1, wherein the pressure injection port is further configured to release fluid from the sealed area to enable relative motion between the gate and the valve seat.

7. The valve of claim 1, further comprising a second seal assembly for an opposite face of the gate.

8. A seal assembly for use in a pocket of a gate valve body, the seal assembly comprising:
    a substantially cylindrical valve seat having a first seal on an outer circumferential surface of the valve seat to seal against an inner surface of the pocket; and
    an energizer ring bushing having a second seal on an outer circumferential surface of the bushing to seal against an inner surface of the pocket and a third seal on the outer circumferential surface of the bushing to seal against an inner surface of the valve seat, the first, second, and third seals configured to define a sealed area within the pocket,
    wherein the valve seat is configured to press against a gate face in response to pressurization of the sealed area, and
    wherein the energizer ring bushing has surface areas of equal cross-section acted on at both axial ends by fluid pressure from the bore so as to experience no net force from the fluid pressure from the bore.

9. The seal assembly of claim 8, wherein the cylindrical valve seat has a back surface to form a boundary of the sealed area and to receive transferred pressure from fluid in the sealed area.

10. The seal assembly of claim 8, wherein when pressed against the gate face, the valve seat is configured to isolate a valve bore from a valve body cavity.

11. A method of operating a valve, the method comprising:
    moving a gate between an open and closed position in a cavity of a valve body to enable or prevent fluid flow through a bore of the valve body; and
    injecting fluid via a pressure injection port into a sealed area, the sealed area being defined by:
        an inner surface of a pocket in the valve body,
        an outer circumferential surface of a substantially cylindrical valve seat,
        a back surface of the valve seat,
        an outer circumferential surface of an energizer ring bushing,
        a first seal between the inner surface of the pocket and the outer circumferential surface of the valve seat,
        a second seal between the inner surface of the pocket and the outer circumferential surface of the energizer ring bushing, and
        a third seal between an inner surface of the valve seat and the outer circumferential surface of the energizer ring bushing,
    wherein said injecting causes the valve seat to press against a face of the gate, and
    wherein the energizer ring bushing has surface areas of equal cross-section at both axial ends acted on by fluid pressure from the bore so as to experience no net force from fluid pressure in the bore.

12. The method of claim 11, wherein the fluid in the sealed area transfers pressure to the back surface of the valve seat.

13. The method of claim 11, wherein the energizer ring bushing has an inner surface flush with a wall of the valve bore.

14. The method of claim 13, wherein the valve seat isolates the cavity from the bore when the gate is in the open position.

15. The method of claim 14, wherein the valve seat isolates the cavity from the bore when the gate is in the closed position.

16. The method of claim 11, further comprising: releasing fluid from the sealed area to enable relative motion between the gate and the valve seat.

* * * * *